United States Patent [19]
Norton

[11] Patent Number: 6,014,227
[45] Date of Patent: Jan. 11, 2000

[54] PRINTER WITH PROGRESSIVE COLUMN ERROR DIFFUSION SYSTEM AND METHOD OF USING SAME FOR IMPROVED PRINTER THROUGHPUT

[75] Inventor: Kirkpatrick W. Norton, San Diego, Calif.

[73] Assignee: Hewlett-Packard Co., Palo Alto, Calif.

[21] Appl. No.: 09/070,552

[22] Filed: Apr. 30, 1998

[51] Int. Cl.[7] .................................................. G06F 15/00
[52] U.S. Cl. ........................ 358/1.9; 358/1.16; 358/1.17
[58] Field of Search ................................. 358/1.9, 1.16, 358/1.17, 1.1, 1.2, 1.3, 1.4, 1.8, 1.15, 502, 518, 523, 524, 534, 535, 536, 404, 429, 444, 447, 448, 455, 456, 457, 458, 459, 466, 298; 382/162, 163, 167, 252, 237, 274–275, 269

[56] References Cited

U.S. PATENT DOCUMENTS

| | | | |
|---|---|---|---|
| 4,930,018 | 5/1990 | Chan et al. | 358/298 |
| 5,031,050 | 7/1991 | Chan | 358/298 |
| 5,111,302 | 5/1992 | Chan et al. | 358/298 |
| 5,140,432 | 8/1992 | Chan | 358/298 |
| 5,150,429 | 9/1992 | Miller et al. | 358/457 |
| 5,172,247 | 12/1992 | Ghaderi | 358/456 |
| 5,268,774 | 12/1993 | Eschbach | 358/466 |
| 5,313,287 | 5/1994 | Barton | 358/458 |
| 5,325,211 | 6/1994 | Eschbach | 358/447 |
| 5,333,243 | 7/1994 | Best et al. | 395/109 |
| 5,337,160 | 8/1994 | Jones | 358/447 |
| 5,377,024 | 12/1994 | Dillinger | 358/502 |
| 5,402,245 | 3/1995 | Motta et al. | 358/298 |
| 5,473,446 | 12/1995 | Perumal, Jr. et al. | 358/523 |
| 5,506,699 | 4/1996 | Wong | 358/456 |
| 5,508,826 | 4/1996 | Lloyd et al. | 358/501 |
| 5,537,228 | 7/1996 | Dillinger | 358/502 |
| 5,579,446 | 11/1996 | Naik et al. | 395/109 |
| 5,619,622 | 4/1997 | Audi et al. | 358/1.8 |
| 5,621,545 | 4/1997 | Motta et al. | 358/518 |
| 5,657,137 | 8/1997 | Perumal, Jr. et al. | 358/502 |
| 5,704,021 | 12/1997 | Smith et al. | 395/109 |
| 5,847,724 | 12/1998 | Mantell | 358/456 |
| 5,946,455 | 8/1999 | Tresser et al. | 358/1.9 |

*Primary Examiner*—Dov Popvici
*Attorney, Agent, or Firm*—Jerry Potts

[57] ABSTRACT

Error diffusion apparatus processes and stores image data on a sub-column basis for pixels below and to the left of a current pixel along a common diagonal. Error data is diffused on a pixel by pixel basis relative to a next pixel right of the current pixel until the left most sub-column of pixels has a height corresponding to the height of the total number of nozzles in a single column of an inkjet printhead. In this manner, error diffusion is accomplished on the fly with buffer memory storage capacity being substantially reduced relative to other error diffusion processes.

9 Claims, 11 Drawing Sheets

PRINTER WITH PROGRESSIVE COLUMN ERROR DIFFUSION SYSTEM AND METHOD OF USING SAME FOR IMPROVED PRINTER THROUGHPUT

TECHNICAL FIELD

This application relates to a computer system printer that converts color space from another system peripheral device to a different type of color space corresponding to the printer. More particularly, this application relates to a raster scan printer with a progressive column error diffusion system that converts color space and diffuses resulting errors on the fly to adjacent pixels in a unique sub-column processing order.

BACKGROUND OF THE INVENTION

Color space images containing hundreds of millions of colors are generally not directly reproducible by an inkjet printer. In this regard, most color inkjet printers are only capable of producing a basic set of eight colors: red, green, blue, cyan, yellow, magenta, black and perhaps another shade of cyan and another shade of magenta. Thus, such printers may be able to reproduce hundreds, thousands, or even tens of millions of colors, but certainly not hundreds of millions of colors.

Since ink jet printers are incapable of reproducing such large numbers of colors, such printers typically employ, what is known to those skilled in the art as, a half toning process. Half toning is an algorithm process that approximates unreachable colors on a receiving medium by clustering drops or dots of different color inks on a medium surface to "average" them together to approximate a desired color.

For example, given an inkjet printer that produces eight colors as mentioned-above, the color orange can be perceptibly reproduced by clustering a group of red and yellow dots in close proximity to one another on the medium surface. The cluster of individual red and yellow dots when viewed by the human eye is perceived as the color orange. In this regard, the human eye is incapable of resolving each individual dot. Thus, the human eye will average the dots together, and the viewer will perceive that he or she is viewing the color orange.

There are many different half-toning methods utilized in converting one color space into another color space. However, the method considered to produce the highest quality color space images is called an error diffusion method.

The error diffusion method involves a process of selecting a printer pixel color that closely matches that of another device color space pixel color, and then printing the selected color. Since the printer color will not usually be the exact same color as that of the other color space pixel color, there will be a color error associated with the conversion process from one color space to the other color space. This error is then divided and diffused into the colors of the pixels in the immediate neighborhood of the printed pixel that have not yet been printed.

Thus for example, if the other color space pixel color is orange, and the error diffusion process selects the closest printer pixel color of red, there will be a resulting error of too much red and not enough yellow. In this case, the error diffusion process would add a little yellow to the color of the surrounding pixels to be printed and remove a little red from the color of the surrounding pixels. Following this procedure, when the next pixel is processed, the printer will select a color that is closest to this modified color, i.e. the original pixel color that has some yellow added and some red removed. When this new pixel is printed it too will have an associated color error, which is in turn, propagated to the pixels surrounding the new location. This process is continued until a row of pixels is processed, at which time the next row is processed. This form of error diffusion was first proposed by Robert Floyd and Louis Steinberg in their published article "An Adaptive Algorithm Spatial Grey Scale" found in the Society of Information Display: Vol. 17, No. 75 (1975). In short, the Floyd et al. process taught that error values associated with the translation of each pixel could be diffused to adjacent pixels to provide a smoother transition between the different color space images.

While processors that have implemented the Floyd et al. algorithm have been successful in helping to improve image quality, the enjoyed improved image quality has been expensive and time consuming. In this regard, the Floyd et al. process as applied to raster scan type printer requires that image data be processed row by row since the errors from one row must be known before the next row can be processed. Thus, as data is processed, the converted rows of image data must be retained in a storage unit until enough rows have been processed and made available for printing.

As is known to those skilled in the art, the typical inkjet printer sweeps its print head transverse to the direction of the path of travel followed by the print medium to effect a raster scan printing process. In this regard, as the print head travels above the print medium, a series of inkjet nozzles on the print head eject or fire ink downwardly onto the medium to create a horizontal "swath" that is composed of a large number of pixel rows as determined by the column height of the print head nozzles. For example, if a print head has a column of 200 nozzles, and one pixel is printed per nozzle, a total of 200 rows of image pixels must be processed and stored in memory before printing of the swath can commence. Printing partial swaths having fewer rows then there are nozzles, is not an option. In this regard, it takes too much time for a partial sweep to be executed which would severely reduce the throughput of the printer. In short then, as a large amount of image data must be converted and stored, large amounts of printer memory are required, which in turn greatly increases the cost of the printer.

Therefore it would be highly desirable to have a new and improved printer with an error diffusion system that is fast and efficient permitting conversion and processing on the fly in a pipeline fashion without the need of using large expensive random access memory storage devices.

SUMMARY OF INVENTION

According to a preferred embodiment of the present invention a novel method of error diffusion processes image data on a pixel by pixel basis in a unique order storing the processed image data until a sub column group of image information results. Once a sub column of processed image information is available, the information is retrieved for printing purposes. Each sub column has a given number of buffer memory locations that corresponds to the number of nozzle arranged in a full column height of a print head in an inkjet printer. The buffer memory read and write cycles are synchronized with swath sweep rate of the printhead permitting a pipelined on the fly error diffusion process with a limited amount of memory storage.

BRIEF DESCRIPTION OF THE DRAWINGS

The above mentioned features of the preferred embodiments of the present invention and the manner of attaining them will become apparent, and the invention itself will be best understood by reference to the following description of the embodiments of the invention in conjunction with the accompanying drawings, wherein.

DETAILED DESCRIPTION OF THE PREFERRED EMBODIMENTS OF THE PRESENT INVENTION

Figure 1:
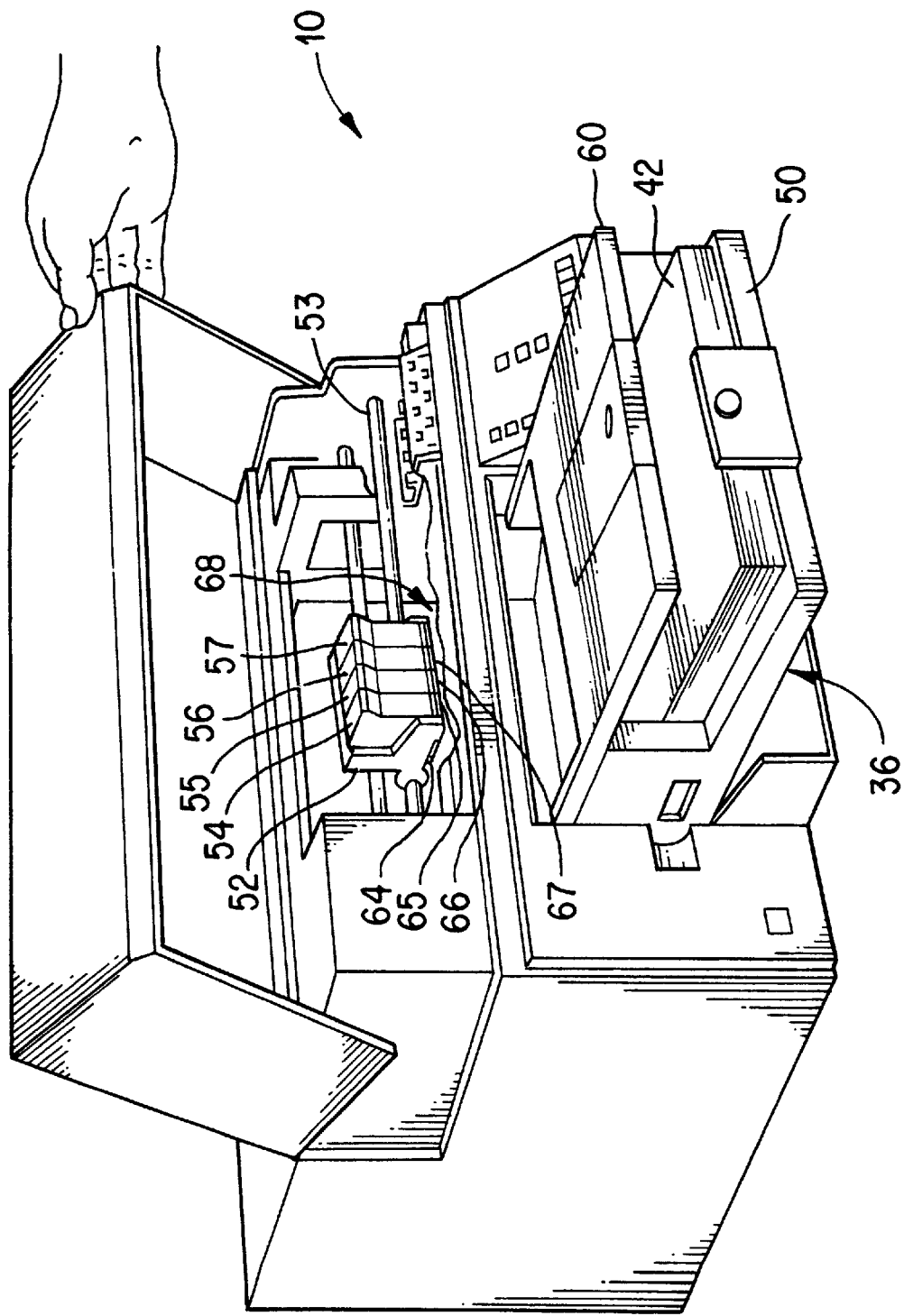
FIG. 1 is a perspective view of an inkjet printer that is constructed in accordance with a preferred embodiment of the present invention.
Figure 2:
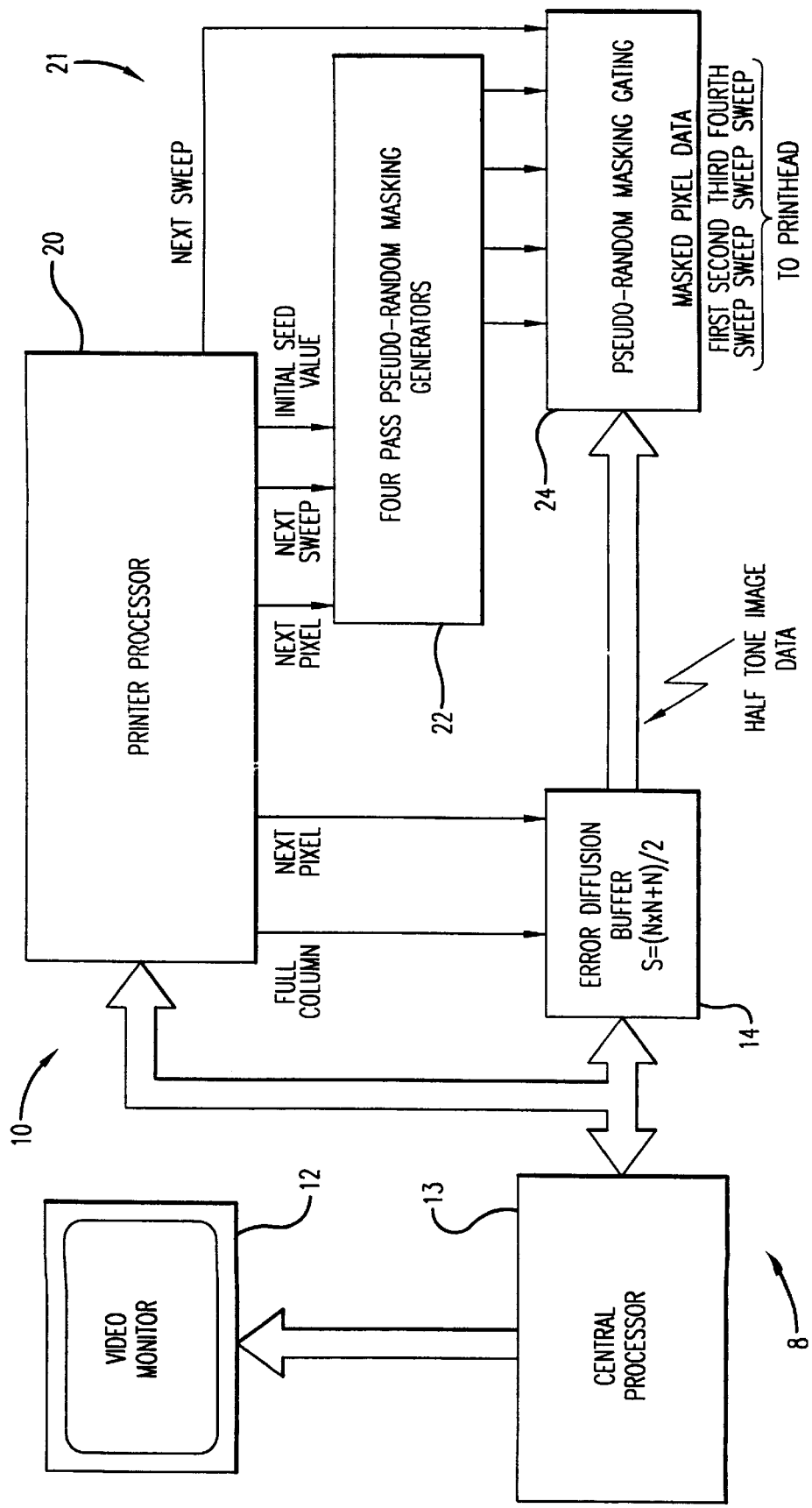
FIG. 2 is a block diagram of an error diffusion system embodied in the inkjet printer of FIG. 1.
Figure 3:
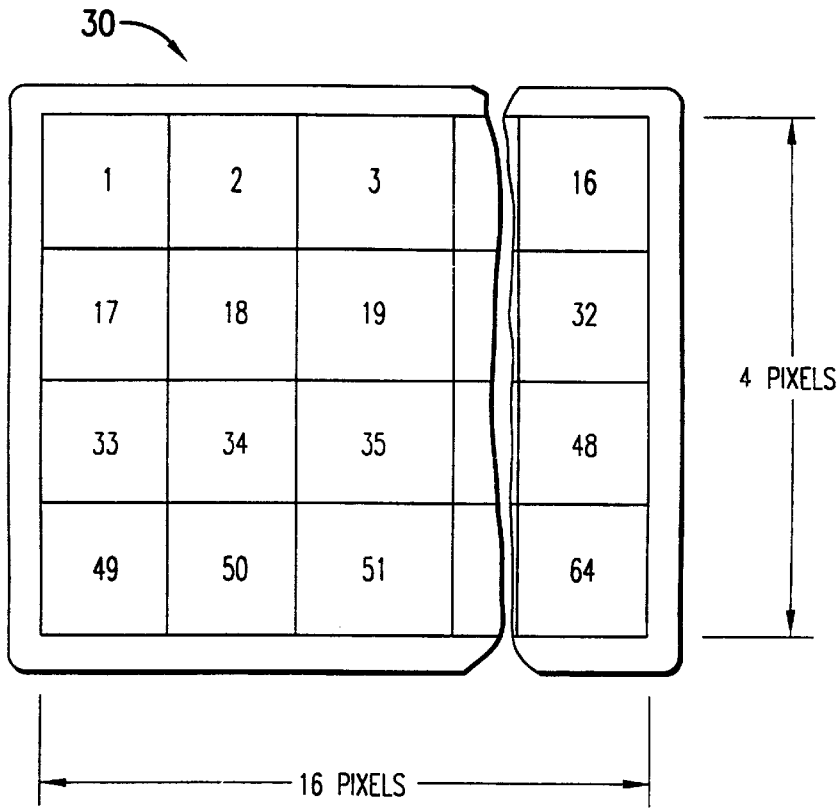
FIG. 3 is a diagrammatic view of a swath of image data arranged in a four by sixteen pixel matrix array.

Referring now to the drawings and more particularly to FIGS. 1–2, there is shown a new and improved inkjet printer 10 that is constructed in accordance with the preferred embodiment of the present invention. The inkjet printer 10 is adapted to be connected to a computer system 8 having a video monitor 12 and a central processor 13. The central processor 13 generates drive or image data signals for the inkjet printer 10 and the video monitor 12, to enable image data to be visually displayed and reproduced in a hardcopy form on a print medium 30 (FIG. 3).

Considering now the inkjet printer 10 in greater detail with reference to FIG. 2, the inkjet printer 10 generally includes a buffer memory unit 14 having a limited amount of storage space locations as defined by equation 1 and a printer processor or controller 20. The processor 20 responds to the central processor 13 when image data is received in one color space, such as a video monitor color space, and converts this image data into another color space reproducible by the printer 10. More particularly, the processor 20 initially receives and stores S number of unconverted color space pixel image values in the buffer memory unit 14. Once the unconverted image data has been stored, the processor 20 under the control of an image processing or error diffusion program 700 (FIG. 7) retrieves, converts and stores converted image data. The converted image data is stored in the buffer memory unit 14 in the form of S number of error diffused color space pixel image values suitable for reproduction by the printer 10. As will be explained hereinafter in greater detail, the processor 20 under the control of the error diffusion program 700 processes image data on the fly diffusing resulting color errors into individual ones of the converted color space pixel image values.

Figure 4:
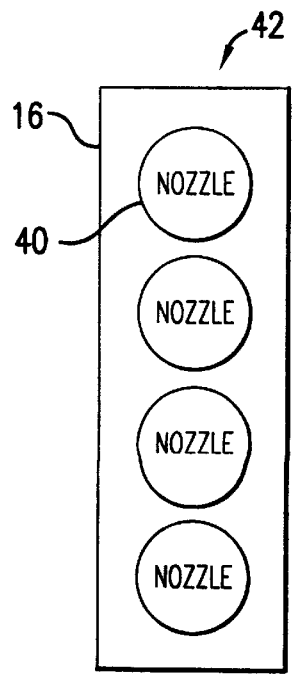
FIG. 4 is a diagrammatic view of the face of a print head having a column of nozzles corresponding in height to the swath of image data illustrated in FIG. 3.

The above-mentioned image-processing program 700 embodies a conventional error diffusion method, but processes individual pixel image values in a unique order that permits on the fly conversion with a minimal amount of storage space. More particularly, the novel error diffusion method processes image data on a sub column by sub column basis as opposed to the conventional row by row method. In this regard, the buffer memory unit 14 is configured in a matrix array that corresponds in size to a full swath of image information. The columnar dimension of the matrix array is selected to match the number of columnar nozzles in a conventional inkjet printhead, such as an inkjet printhead 16 as illustrated in FIG. 4. The row dimension of the matrix array is selected for maximizing memory efficiency, thus the dimension is provided by equation 1 which is a sufficient number of locations to enable on the fly conversion while printing a swath of image information. The novel processing method does not compromise image quality as resulting errors from the conversion process are diffused in accordance with a conventional error diffusion method but with the significant advantage of permitting on the fly processing while an image is being printed. From the foregoing, those skilled in the art will appreciate that the novel method significantly improves throughput while providing substantial cost savings in that less memory is required for the storing of print-masked data as well.

Considering now the novel method in greater detail, the processing method includes converting S number of color space pixel image values provided by a color space peripheral device, such as the computer video monitor 12 into S number of error diffused color space pixel image values. The S number of error diffused color space pixel image values are then temporarily stored in the buffer memory unit 14 to facilitate gating the stored values to an inkjet print head, such as the inkjet print head 16. As best seen in FIG. 4, the print head 16 includes at least one columnar set 40 of inkjet nozzles, such as an inkjet nozzle 42.

The buffer memory 14 has a total of S number of storage locations, where S is defined by equation 1. The value of N as expressed in equation 1 is the same as the total number of nozzles in the set 40 of inkjet nozzles. From the foregoing, it should be understood by those skilled in the art that if a print head has 100 nozzles in a column for example, then the buffer memory would need to be large enough to hold 5050 error diffused pixels at one time. In a like manner if a print head has 4 nozzles as illustrated in FIG. 4, the buffer memory would need only to hold 10 error diffused pixels at one time.

EQUATION 1

$$S_{buffer} = (N^2 + N)/2$$

where N=the number of nozzles in the pen column; and where $S_{buffer}$=The number of error diffused pixels buffered.

Once a single column of error diffused color space pixel image values have been stored in the buffer memory 14, the stored column is gated out to the printhead. The gating of the column of information makes the column immediately available for the storage of another set of color space pixel image values to be diffused on the fly.

Figure 5:
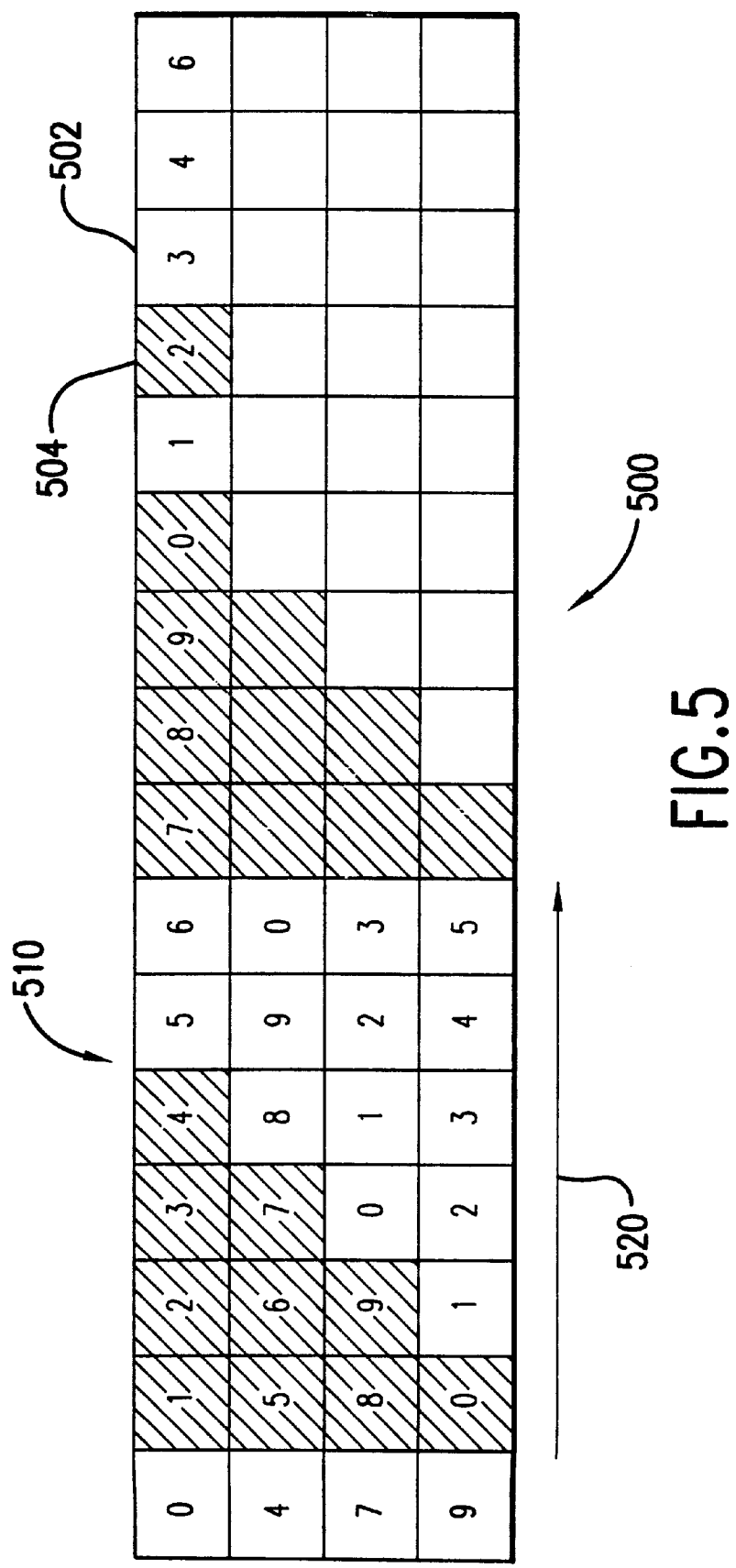
FIG. 5 is a diagrammatic view of the storage of pixel image data in a buffer memory unit forming part of the error diffusion system of FIG. 2.
Figure 6:
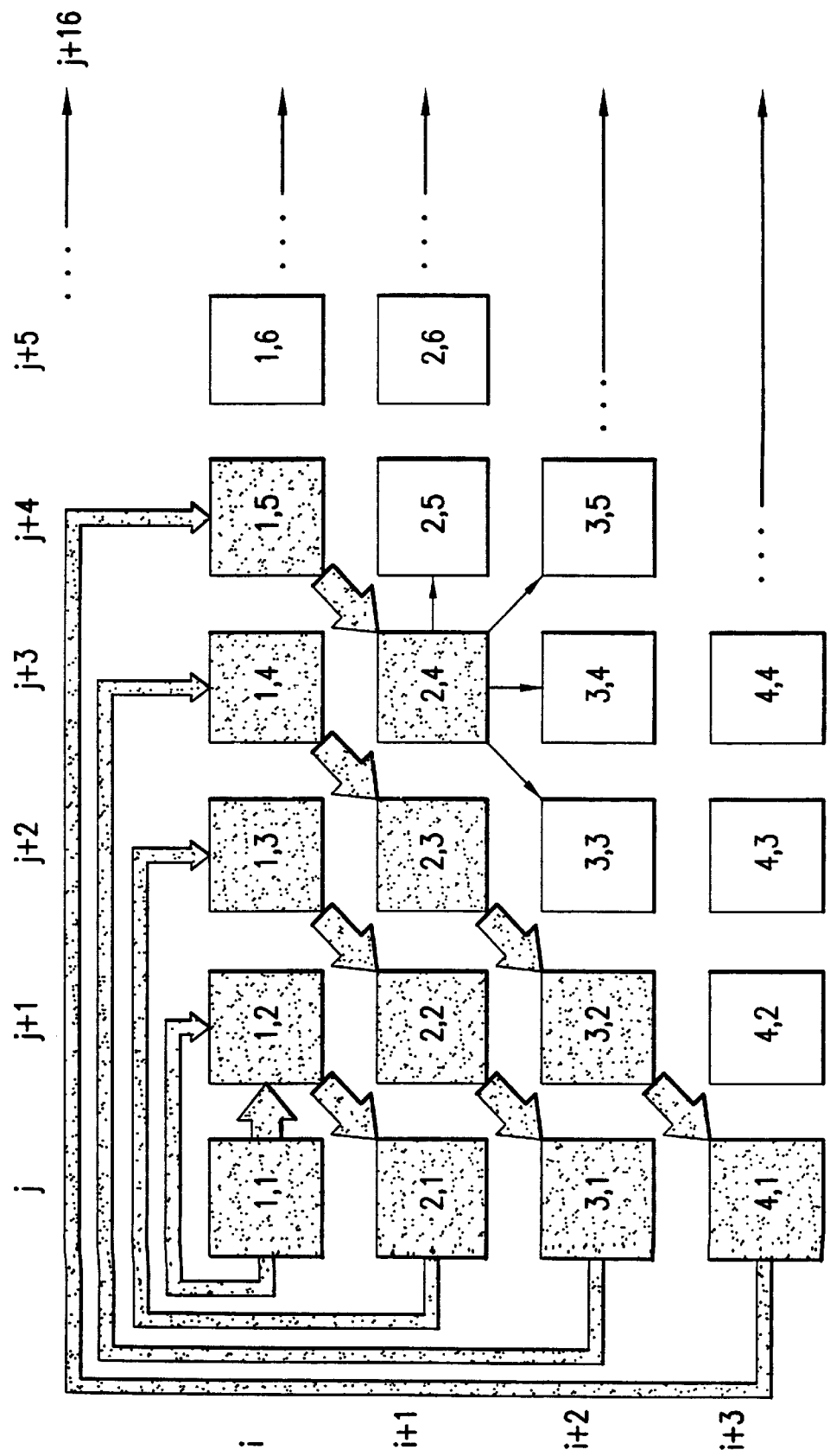
FIG. 6 is a diagrammatic representation of the manner of processing image data and diffusing resulting color errors.

Considering now the novel method in still greater detail, FIGS. 5 and 6 illustrate a triangular buffer arrangement as it is beginning to be filled. Once the height of the leftmost column in FIG. 5 reaches that of the pen nozzle column 22, the buffer figuratively speaking, slides to the right as new diagonals are processed, but the height remains fixed at the column height.

Maximum efficiency of the buffering scheme is accomplished where each column of processed data is stored in those buffer memory locations that previously held the image data from the leftmost column processed immediately there before. In this regard, a memory addressing order is established to process each pixel on the fly using determined read and write locations for each pixel. Many different buffering schemes are available that will accomplish this objective. Therefore, the following is only a simple example where the number of nozzles in a pen column is four nozzles, and the number of buffer memory storage locations is ten based on equation 1.

A group 500 of boxes as illustrated in FIG. 5, diagrammatically represents a portion of an image 30 (FIG. 3) that is four pixels high and sixteen pixels wide. Each box, such as a box 502, is indicative of a single pixel in the image 30, and the number within each box is indicative of a physical address in the illustrative buffer memory. In short then, the data for a given pixel in the image 30 is stored in the memory address shown, for example by the address in such as box 504.

The addresses in the illustrative buffer memory range from zero to nine for a total of ten locations, which is the same number obtained from applying equation 1 to this example as follows:

$$S_{buffer}=(4^2+4)/2=(16+4)/2=(20)/2=10$$

As illustrated in FIG. 5, certain ones of the boxes are shaded, such as a shaded box 504, to indicate the buffer usage at different locations in a swath of printed information. In this regard, as a swath of image information is processed, printing from left to right across a print medium, the triangular shaped shaded buffer portion of the buffer memory in a like manner sweeps from left to right across the buffer memory locations as shown. Thus, processing of the swath data is synchronized with the storage of image data in the buffer memory.

From the foregoing, it should be noted that each of the ten locations illustrated in FIG. 5, appears only once in any shaded region, and the completed column immediately to the left of each shaded region contains the same address as the adjacent shaded region diagonal. Thus, for example, in a shaded region 510, the full diagonal therein includes in order memory locations 4, 7, 9, and 0, while the adjacent column includes the same memory locations in order 0, 4, 7, and 9. The buffer memory is therefore utilized to its maximum capacity in the most efficient manner possible. More particularly, when a column is finished, meaning that each location in the column stored with processed image information has been retrieved and transferred for printing purposes, the memory locations previously utilized in the column are immediately reused by the next diagonal sequence. In this manner, the address sequences along the diagonal follow the discrete progression for the equation $(n^2+n)/2$ allowing each address to be easily computed as a series of differences. Such a series of difference is clearly illustrated in FIG. 5.

The full matrix array of FIG. 5 relative to a pen with a four-nozzle height column as illustrated in FIG. 3 can be expressed as follows:

```
0 1 2 3 4 5 6 7 8 9
4 5 6 7 8 9 0 1 2 3
7 8 9 0 1 2 3 4 5 6
9 0 1 2 3 4 5 6 7 8
```

From the above full matrix array those skilled in the art should understand that the difference between the first index in a column and the second is always equal to the number of rows in the swath (4 in this example case). Thus, for the first column we find (4-0=0), and for the last column we find (3-9=4) since the distance between 3 and 9 in the descending direction is 4 (i.e. 3, 2, 1, 0, 9: the distance between 3 and 9 is the same as the distance between 4 and 0:, 3,2, 1,0).

The entire array of indexes can be offset by a fixed amount. However, the difference between indexes from one position to the next should be the same. Those skilled in the art should understand that the expressed index difference is the most efficient indexing method from an integrated circuit complexity standpoint because calculating the index values is relatively straightforward relative to other options. There are a few variations on the indexing sequence, such as allowing it to decrement downward for example. However, the simplest method is to utilize a progression based on the $(n^2+n)/2$ progression since the progression terms are easily determinable.

Considering now the printer 10 in still greater detail, the printer 10 is a multipass printer and further includes a masking system 21 having a set 22 of four pass pseudo-random masking generators that facilitate masking the converted image data on a pixel by pixel basis. The set 22 of pseudo-random masking generators are more fully described in co-pending U.S. patent application Ser. No. 09/070550, and will not be described hereinafter in greater detail. It should be noted that pseudo random masking might be performed on columns, on rows or on an individual pixel by pixel basis depending upon the module transferring the pixel information to the masking system. Thus, it should be understood by those skilled in the art that in the preferred embodiment of the present invention there is no intention of limitation relative to the masking system even though the pixel information from the progressive column error diffusion module described herein, is configured by columns. In short, the order in which the pixel data are masked is arbitrary. Each pixel is masked in a fashion that is random with respect to every other pixel, so the masking order is not determinative. In this regard, even if progressive column order error diffusion as described herein is utilized, the half toned data could conceivably be stored in an intermediate buffer and masked in any order; i.e. by column, by diagonal, or randomly.

In order to facilitate the gating of the masked converted image information to the print head, the masking system 21 also includes a gating arrangement 24. The gating arrangement 24 enables the converted and masked image information to be gated relative to individual ones of the sweeps in the multi-pass mode of operation. In this regard, the gating is accomplished for each of the four sweeps with pixel information from the error diffusion module being passed on a column by column basis.

By way of example, one method of processing the incoming image data will be described. The described method relates to a simple binary conversion process to facilitate ease in understanding the processing sequences and is not intended to be a limitation. Other color space conversion techniques however are contemplated within the true scope and spirit of the present invention. More specifically, for example, data may be gamut reduced so that the color gamut of the error diffused data is smaller than that of the original data. In this regard, if a printer prints only 8 different levels of each ink at a given medium location, it is possible to error diffuse an image with eight bits per color down to three bits per color or to eight levels. Binary error diffusion down to one bit is appropriate for binary printers. In short then, although a binary error diffusion example will be discussed, such a processing sequence is not intended to be a limitation as multi level printers, such as 4 or 8 levels of each ink color, are contemplated within the true scope and spirit of the present invention.

Figure 7:
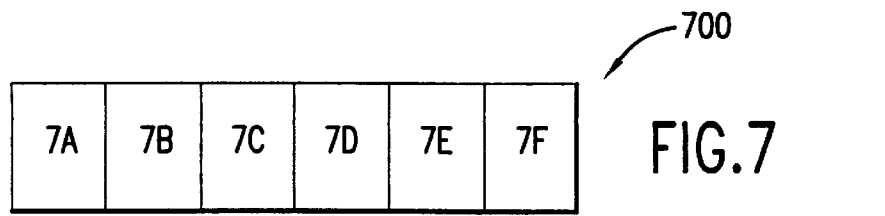
FIG. 7 is a flowchart showing the steps performed by the error diffusion system of FIG. 2 in processing image data.

By way of example then, in FIG. 6 the sequence steps are diagrammatically illustrated for a 4 row by 16 column matrix array buffer memory. Columns in the buffer memory are identified by the notation (J+n, where n is between 0 and 16) while rows are identified by the notation (I+m, where m is between 0 and 4). FIG. 7 is referenced relative to FIG. 6. In this regard, shaded boxes of a given row and column in FIG. 6 are crossed referenced in FIG. 7 to shaded boxes of the same given row and column.

Considering now the illustrative example of the processing sequences in greater detail with reference to FIGS. 6–7, the processing program 700 starts by accessing an unconverted gray scale pixel value from the first row I and first column J of the matrix array buffer memory unit 14. The processor 20 then calculates a corrected gray scale value for the current pixel ($R_I C_J$). Once the corrected gray scale value has been calculated, the program proceeds to calculate the binary value for the current pixel utilizing a generalization formula:

$$G_I > T, P_{I,J} = 1 \text{ and } G_I < T, P_{I,J} = 0$$

The determined binary for the current pixel is then stored in the buffer memory at the current pixel location (I, J+1) replacing the unconverted gray scale value.

Figure 7A:
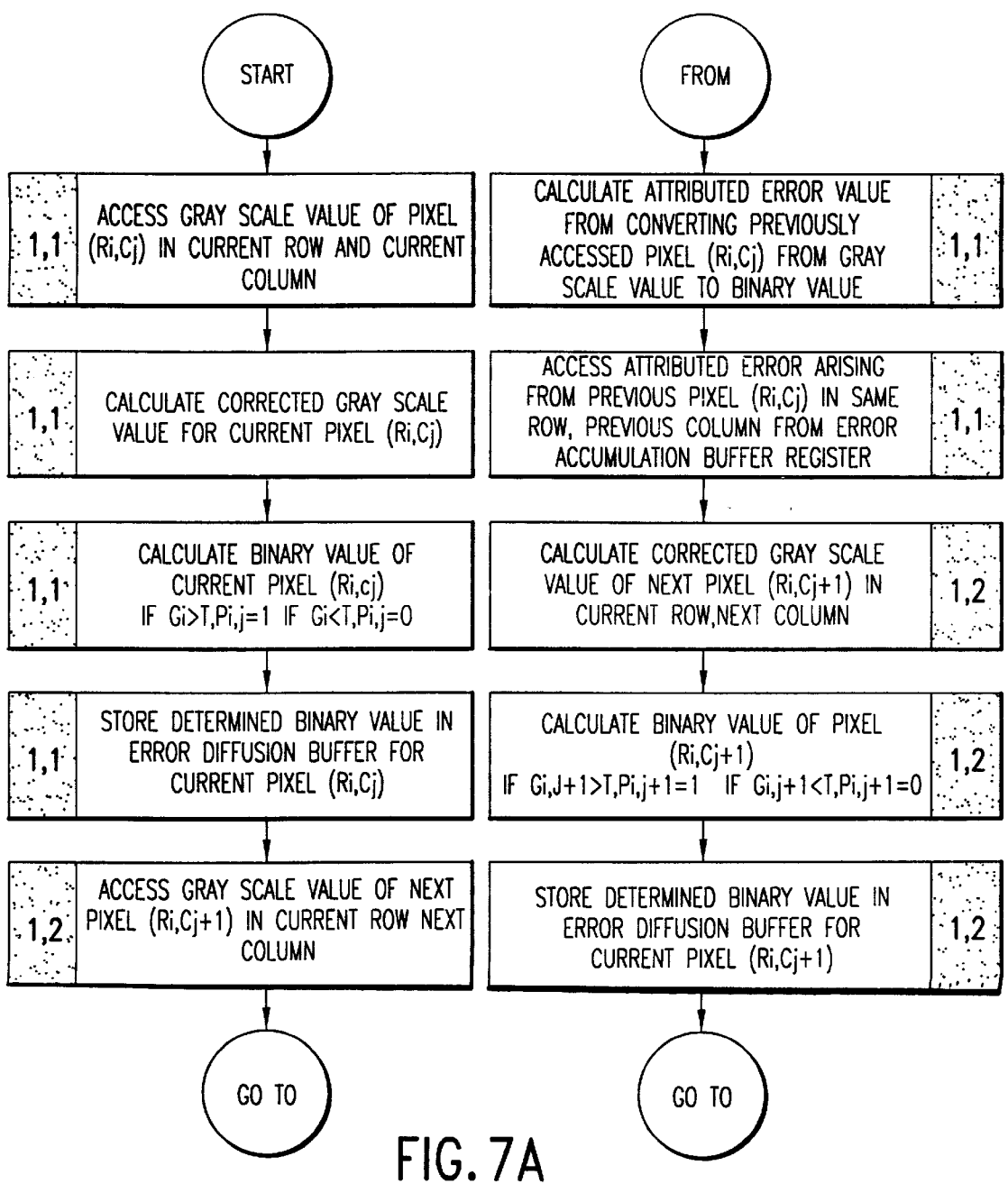

The program then proceeds to access the gray scale value of the next pixel memory location (I, J+1) in the current row and next column. The program then causes the processor 20 to calculate the attributed error value from converting the previous accessed pixel (I, J) from its gray scale value to the binary value ($G_I$). Once the attributed error value is determined the program advances and accesses the attributed error value arising from the previous pixel. The program then causes the processor 20 to calculate or determine the corrected gray scale value of the next pixel (I, J+1). When the corrected gray scale value is determined, the program goes to the next step shown in FIG. 7A and calculates the binary value for the current pixel at location (I, J+1) using the generalization formula. The determined binary value is then stored in the current pixel memory location (I, J+1).

Figure 7B:
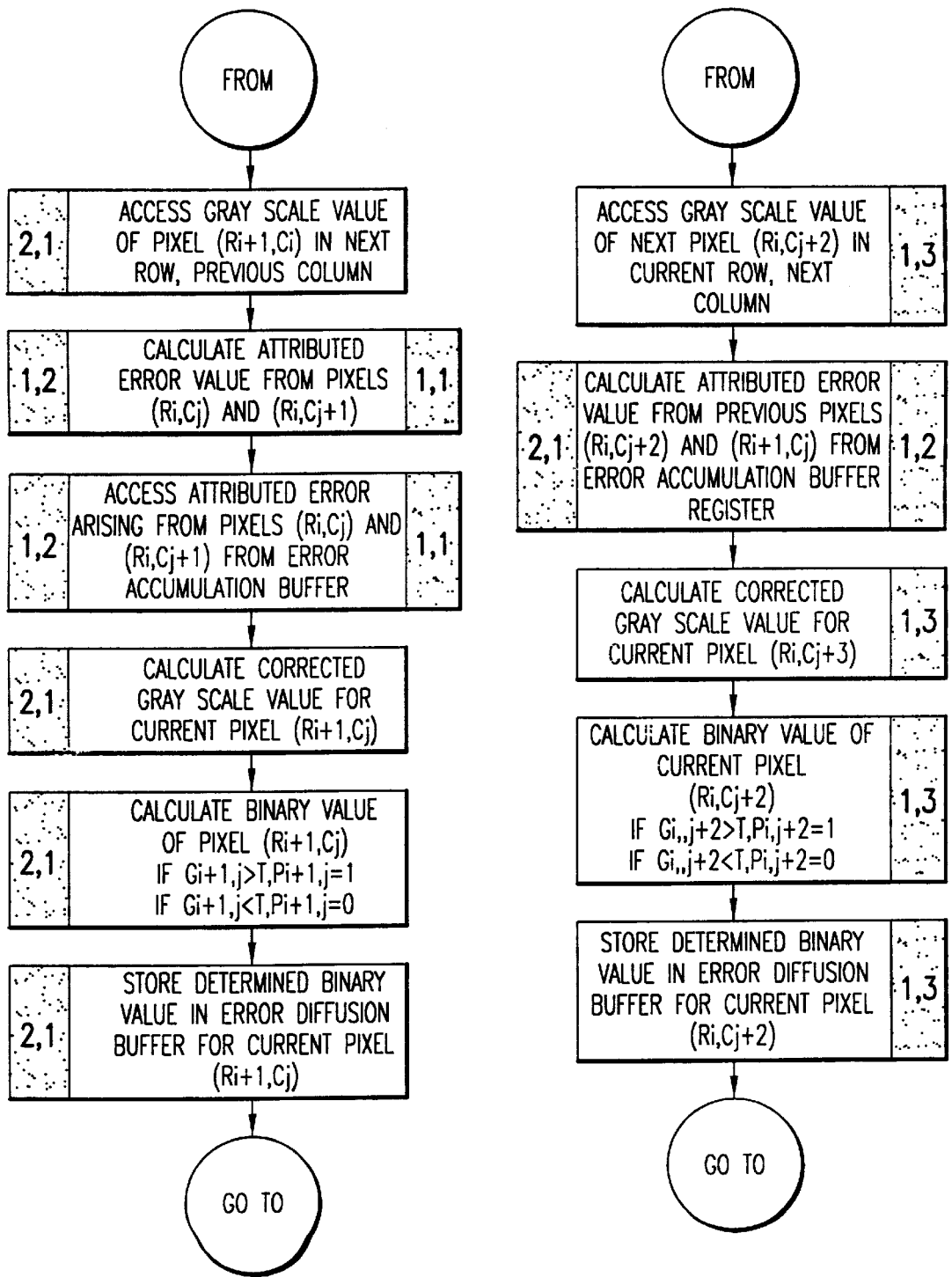
Figure 7C:
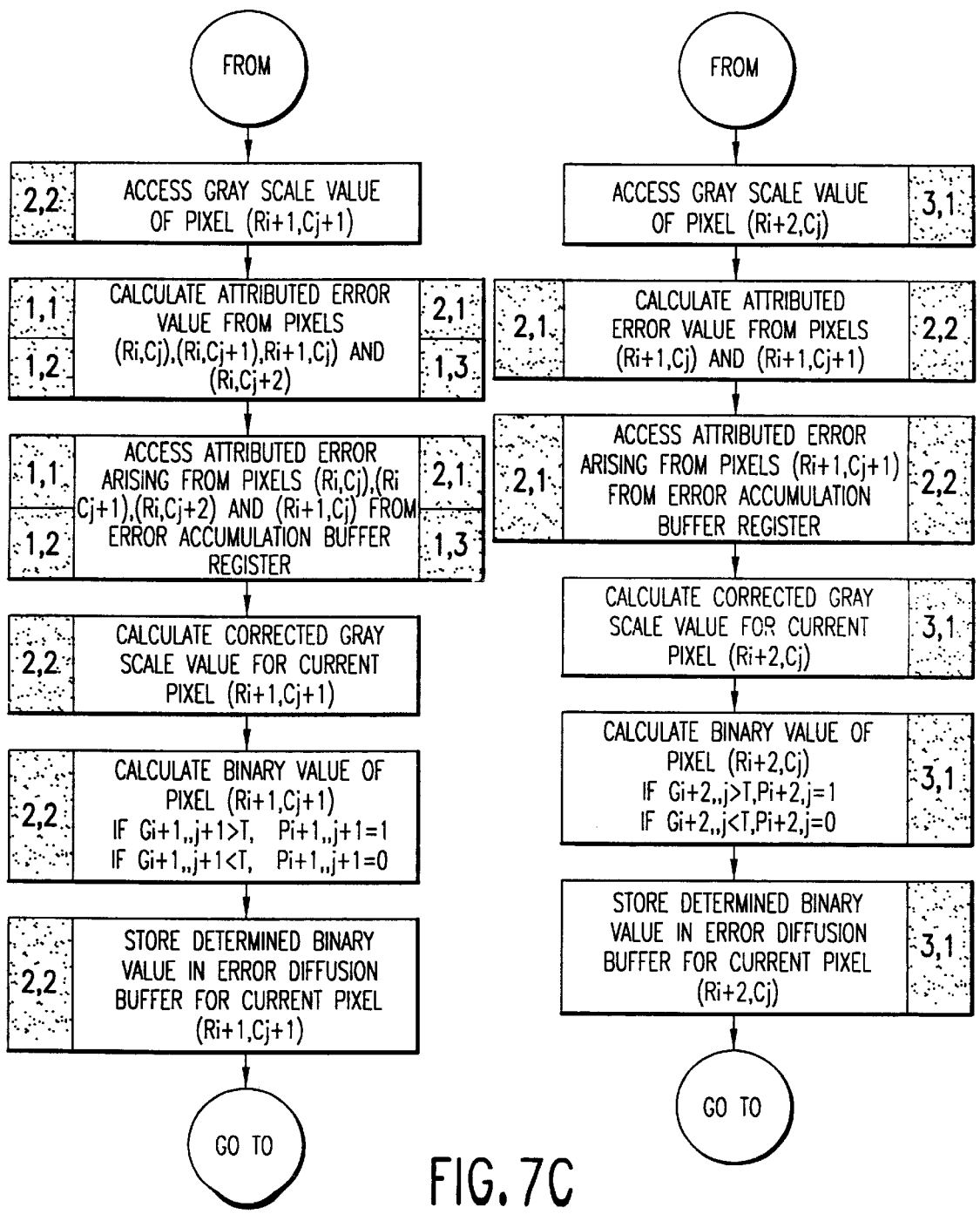
Figure 7D:
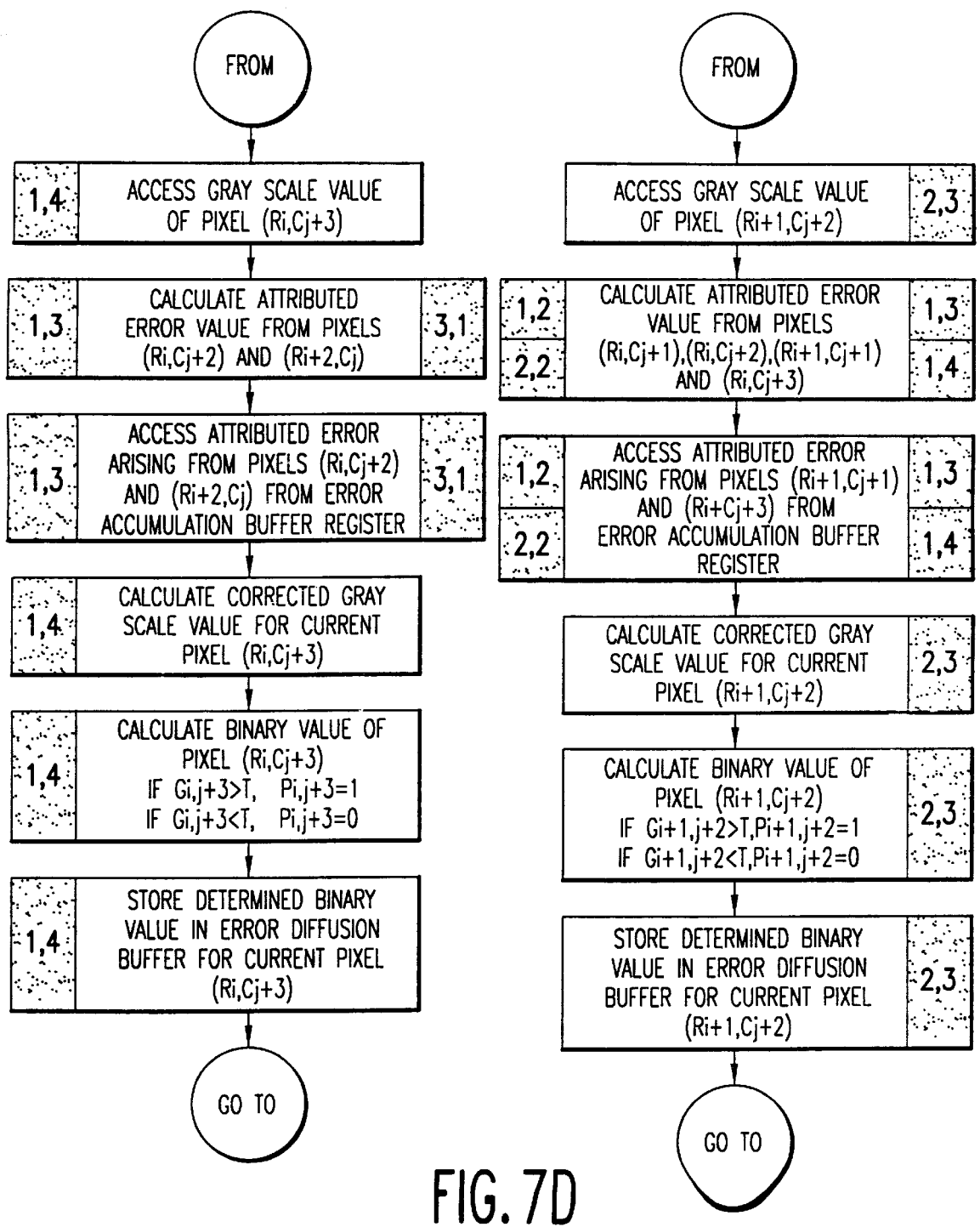
Figure 7E:
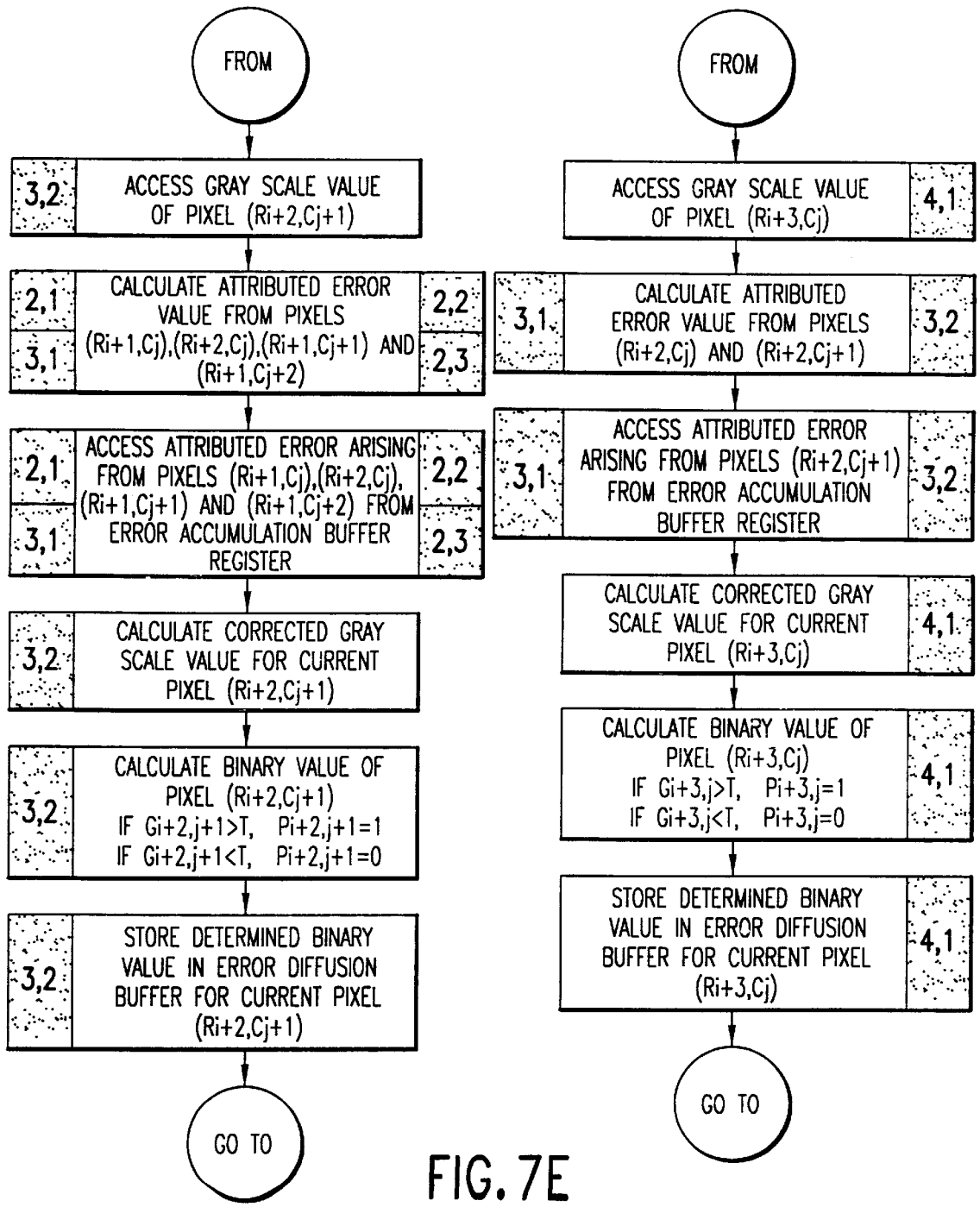

As best seen in FIG. 6, the program now causes the gray scale value of the next pixel in the next row (I+1) and the first or previous column (J) to be accessed. Attributed errors from the first pixel location (I, J) and the second pixel location (I, J+1) are then calculated. The determined error values arising from pixel memory locations (I, J) and (I, J+1) are accessed so that a corrected gray scale value for the current pixel (I+1, J) can be calculated in the next step. Once the corrected gray scale value for the current pixel (I+1, J) has been calculated, the program proceeds to cause the processor to calculate the binary value of the current pixel (I+1, J) utilizing the generalization formula shown in FIG. 7B. The determined binary value is then stored in the buffer memory 14 at the current location (I+1, J).

Again as best seen in FIG. 6, the program now processes the next pixel in the first row (I) and the next column (J+2). In this regard, the program causes the processor 20 to access the gray scale value of the pixel in memory location (I, J+2) and calculate the attributed errors from the previous pixel conversions at (I, J+2) and (I+1, J). The program then proceeds to cause a corrected gray scale value to be calculated for the current pixel at location (I, J+3).

Next, the program calculates the binary value of the current pixel (I, J+2) utilizing the generalization formula:

$$G_{I, J+2} < T, P_{I, J+2} = 1 \text{ and } G_{I, J+2} > T, P_{I,J+2} = 0$$

The program then proceeds to store the determined binary value at the current memory location (I, J+2). The processing order continues in a similar manner as best seen in FIGS. 6 and 7 until all of the pixel information in the first column (J) has been processed. The converted pixel information in the first column is then transferred to the masking system where the data is gated to the printhead 16.

Figure 7F:
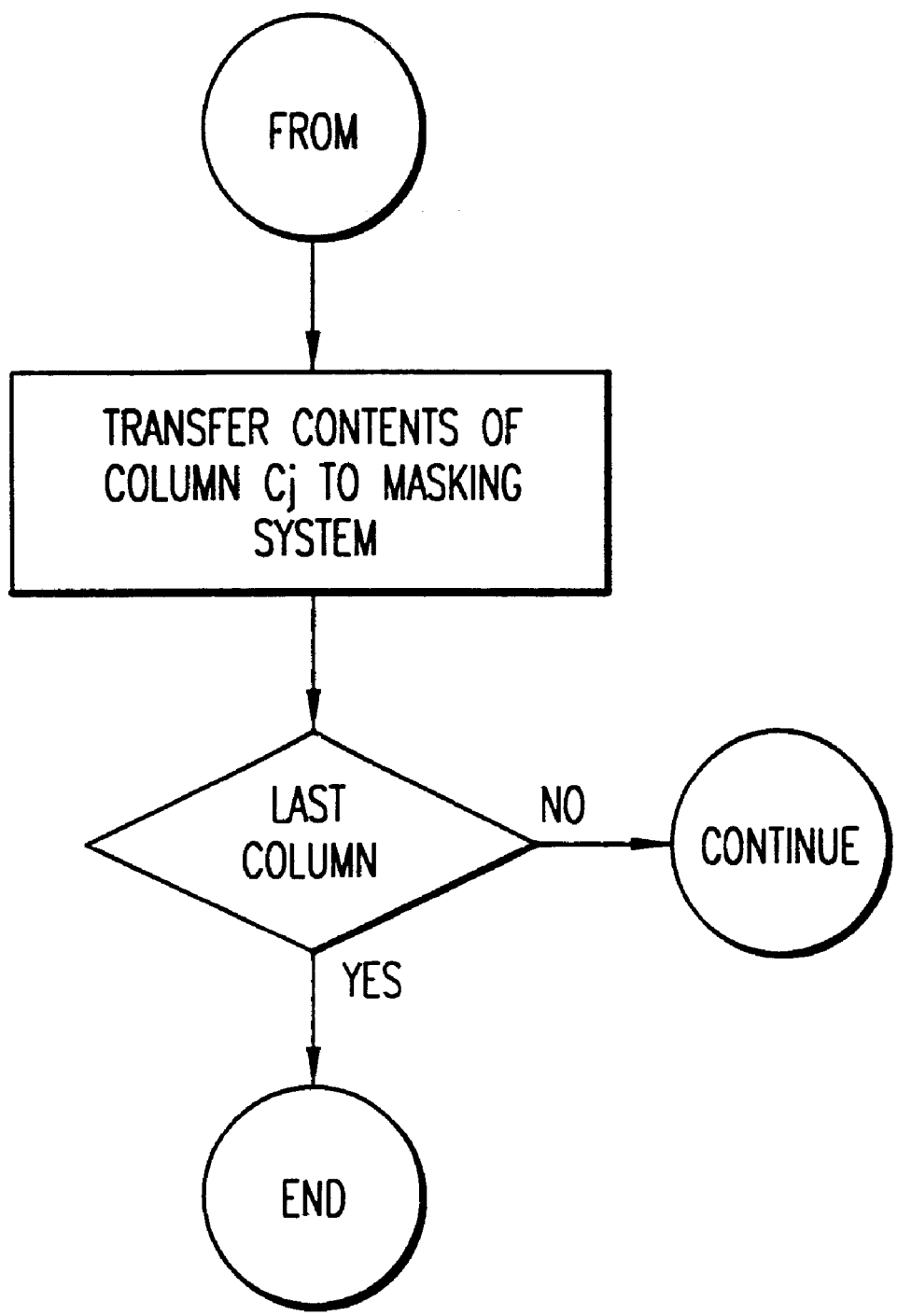

As best seen in FIG. 7F, the program then advances to a decision instruction to determine whether the transferred sub column information was the last column in the current sweep of the printhead 16. If the column was the last column, the program advances to an end command and waits for the unconverted data in the next sweep to be loaded into the buffer memory 14. If the column was not the last column, the program continues processing data on the fly in a similar manner until the last column of converted image information has been transferred to the print head 16 for printing purposes.

In conclusion then, error propagation relates to which pixels color errors affect a certain pixel color. Processing propagation, or process order flow, is the order in which each pixel is processed. For example, assume the following pixel array:

A B C D
B F G H
I J K L
M N O P

Both column order and normal error diffusion employ the same error propagation algorithm. For instance, when pixel G is processed, its color error is propagated to pixels H, J, K and L before they are processed. This propagated error from pixel G is stored so that it is available to be used later for processing pixels H, J, K and L when their time comes to be processed. Since pixel G has been processed and its color error is stored, the next pixel is processed. For normal (progressive row) error diffusion, the next pixel is H, but for the disclosed preferred embodiment of progressive column error diffusion, the next pixel is J. When the J pixel is processed, the error for the location of pixel J (which is the stored sum of the propagated errors from pixels E, F, G and I) is read from the error buffer and utilized in the processing of pixel J. As pixel J is processed, its color error is propagated to pixels K, M, N and O. Error propagation determines which pixel color errors affect the surrounding pixel locations. Processing order determines when these errors are utilized to process the image pixels at these pixel locations.

While a particular embodiment of the present invention has been disclosed, it is to be understood that various different modifications are possible and are contemplated within the true spirit and scope of the appended claims. There is no intention, therefore, of limitations to the exact abstract or disclosure herein presented.

What is claimed:

1. An error diffusion method, comprising:
   converting S number of color space pixel image values to S number of error diffused color space pixel image values;
   storing said S number of error diffused color space pixel image values in a matrix array buffer memory of n by m storage locations, said buffer memory having a total number of storage locations defined by:

$$S = (N \text{ times } N+N)/2$$

where N is the total number of nozzles in a single column of an inkjet printhead; gating n number of error diffused color space pixel image values from said buffer memory to said print head to form a column of ink droplet on a print medium, said n number of error diffused color space pixel image values being stored in a single column in the n by m matrix array buffer memory; and repeating said steps of converting, storing and gating a sufficient number of times to enable said print head to form a complete swath of image information on said print medium.

2. An error diffusion method according to claim 1, wherein N and n are equal to one another.

3. An error diffusion method according to claim 1, wherein said step of repeating is performed on the fly as said print head sweeps across said print medium.

4. An inkjet printer having at least one printhead with N number of nozzles arranged in a column for ejecting ink droplets onto a sheet of medium for printing an image comprising:

a buffer memory for storing processed image data;

said buffer memory having $(N^2+N)/2$ memory locations, arranged in a matrix array of N number of locations by $(N^2+N)/2$ number of locations where N is equal to the N number of nozzles in the at least one printhead; and a controller coupled to said buffer memory for processing image data from one color space to another color space and for causing processed image data to be stored in said buffer memory and to be retrieved therefrom on a column by column basis, where each column includes N number of locations to permit the processed image data to be retrieved on the fly in synchronization with the printhead as it sweeps across the sheet of medium.

5. An error diffusion system, comprising:

a buffer memory having n by m storage locations, said buffer memory having a total number of storage locations defined by:

$$S=(N \text{ times } N+N)/2$$

where N is the total number of nozzles in a single column of an inkjet printhead;

a processor for converting S number of color space pixel image values to S number of error diffused color space pixel image values;

a control program stored in said processor for causing said S number of error diffused color space pixel image values to be stored in said buffer memory and for gating n number of the stored error diffused color space pixel image values from said buffer memory to said print head to form a column of ink droplet on a print medium, said n number of error diffused color space pixel image values being stored in a single column in the n by m buffer memory; and said processor under the control of said control program repeatedly converting another S number of color space pixel image values to S number of error diffused color space pixel image values and causing them to be stored in and gated from said buffer memory a sufficient number of times to enable said print head to form a complete swath of image information on said print medium.

6. An error diffusion system according to claim 5, wherein said processor and control program causes said converting, storing and gating to be performed on the fly as said print head sweeps across said print medium.

7. An error diffusion system, comprising:

means for storing S number of error diffused color space pixel image values in a matrix array of n by m storage locations, said matrix array having a total number of storage locations defined by:

$$S=(N \text{ times } N+N)/2$$

where N is the total number of nozzles in a single column of an inkjet printhead;

means for converting S number of color space pixel image values to said S number of error diffused color space pixel image values;

said means for converting gating n number of error diffused color space pixel image values from said means for storing to said print head to form a column of ink droplets on a print medium, said n number of error diffused color space pixel image values being stored in a single column in the n by m matrix array; and said means for converting repeatedly converts, stores and gates image information a sufficient number of times to enable said print head to form a complete swath of image information on said print medium.

8. An error diffusion system according to claim 7, wherein N and n are equal to one another.

9. An error diffusion system according to claim 7, wherein said means for converting converts, stores and gates image information on the fly as said print head sweeps across said print medium.

* * * * *